United States Patent Office 2,929,803
Patented Mar. 22, 1960

2,929,803

ELASTIC COPOLYUREAS FROM SECONDARY DIAMINES AND PROCESS FOR MAKING THE SAME

August Henry Frazer, Wilmington, Del., and Joseph Clois Shivers, Jr., West Chester, Pa., assignors to E. I. du Pont de Nemours and Company, Wilmington, Del., a corporation of Delaware No Drawing. Application January 31, 1955
Serial No. 485,292

16 Claims. (Cl. 260—77.5)

This invention relates to new linear polymers comprising ureas linked to polyethers through urethane groups and especially to the elastic products obtained with certain compositions. This invention relates particularly to the filaments prepared from these copolyureas.

Attempts are constantly being made to overcome the deficiencies of polymers utilized in such applications as films and molded objects and particularly for filaments, which will be utilized in such applications as woven and non-woven fabrics, felts, papers, and the like. For example, intensive efforts have been made in recent years to improve the dyeability and wearing comfort of the synthetic fibers. One approach has been to attempt to modify suitably the properties of the polymers which have gained commercial acceptance. A more difficult but potentially more fruitful long range approach is to synthesize new polymers free of the deficiencies of those now available. There is a particular need in textile and allied fields for a synthetic material to replace rubber, which possesses a number of disadvantages for textile applications that tend to offset its desirable elastic properties. It is, therefore, desirable to find a new material which is highly elastic, has a higher modulus and better abrasion resistance than rubber, and which is particularly suited to the preparation of filaments, but which does not possess the undesirable characteristics of rubber.

An object of this invention, therefore, is to provide new polymers which can be formed into films and molded objects and which are particularly suited to the formation of filaments which can be utilized in fabrics, papers, felts, and similar applications. Another object is to provide synthetic polymers and filaments which possess high elastic recovery. An additional object is to prepare copolymers and filaments which have both a high polymer melt temperature and a low second order transition temperature. These and other objects will be evident from the following discussion.

The objects of this invention are accomplished by utilizing a rapid, smooth polymerization technique which produces a linear polymer of the desired chemical composition and physical characteristics. A linear polyether/urethane/urea copolymer is prepared by polymerizing a secondary diamine, a polyether glycol and a copolymerizable monomer capable of forming urea linkages with the diamine and urethane linkages with the glycol. As will be seen the polymer is a copolyurea made, for example, by effecting condensation reactions between monomeric diamines, a biscarbamyl halide of a monomeric diamine, and a polyether bis(haloformate) derived from a polyether glycol, the diamines being all or predominantly secondary diamines. The techniques that can be used are melt polymerization, solution and interfacial polymerizations. The physical make-up of the polymer is such that the polymer has a high melt temperature and a low second order transition temperature. This represents the first time a polymer of this type having these characteristics has been prepared. Physically, the polymer is composed of at least two segments: one segment which is crystalline and represents one or more repeating units of a polymer which melts above 200° C. in the fiber-forming molecular weight range (about 5000 or higher) and the second segment, chemically bonded to the first, which is also polymeric in nature but has a melting point below about 50° C. This latter segment is derived from a polyether glycol and the high melting segment is a urea derived from a diamine. The presence of these segments is shown graphically in the X-ray diffraction patterns and studies of the polymers of this invention. The polyether glycol can be readily selected from a large list of known polyethers having known melting points, and the melting points and crystalline characteristics of urea segments prepared from the diamines are well known or readily determined. The reactants may be fed simultaneously to a reaction zone or the intermediates may be formed and condensed in any desired sequence. Since the final products are derived from a polyether glycol and a urea linked by urethane groups, they are polyether/urethane/ureas. The amounts of the components are regulated and the elastomers which result are very readily shaped into elastic filaments.

Thus, this invention provides linear copolymers comprising (1) a urea segment or unit prepared from complementary monomers capable of forming a fiber-forming polymer with a polymer melt temperature of at least 200° C. in the fiber-forming molecular weight range linked through urethane groups to (2) a polyether having a molecular weight above about 600 (preferably between about 800 and about 5000) and a melting point below about 50° C. These polymers are obtained by reacting a polyether glycol or a derivative thereof with one or more diamines or derivatives suitable for forming urethane linkages and the proper complementary monomers required to react with the diamines or derivatives to form a urea. Thus, the products are urea urethanes in which one of the components is a polyether.

One of the monomers of part (1) must be a diamine or a derivative thereof and at least 50% of the diamine residues introduced into the final polymer must be a disecondary diamine or be derived from a disecondary diamine. Usually, the products of composition (1) will be homopolymer, but many monomers leading to copolymers are suitable. Component (2) is also usually a homopolymer, but frequently it is desirable to use a copolymer to modify the melting or solubility or other characteristics. Preparation of filaments from apparently similar products has not been demonstrated previously. The discovery of the melting point and molecular weight limitations on the macromolecular segment and the melting point limitation on the high melting segment has provided materials which are highly satisfactory for filament formation.

In general, the linear segmented polymers of this invention may be described as consisting essentially of a multiplicity of urea segments containing at least one repeating unit of a fiber-forming polyurea, the repeating unit being represented by the formula:

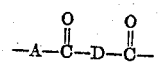

wherein —A— and —D— are bivalent organic radicals containing terminal nitrogen atoms, to each of which nitrogen atoms is attached one of the indicated free valences of the radicals —A— and —D—, with the proviso that not more than 50% of the nitrogen atoms bear hydrogen, the said polyurea having a melting point of at least 200° C. in the fiber-forming molecular weight range, at least some of the urea segments being connected by urethane linkages of the formula

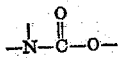

wherein

is one of the terminal nitrogen atoms of the aforementioned radical —A—, to polyether residues which are the radicals remaining after removal of the terminal hydroxyl groups of a polyether glycol consisting essentially of divalent hydrocarbon groups joined by intralinear ether oxygen atoms, the polyether glycol having a melting point below about 50° C. and a molecular weight above about 600, the urea segments constituting from about 10% to about 40% by weight of the said polymer.

There are three reactions which may be considered as generally suitable for preparing the copolymers of this invention by the polymerization techniques mentioned above. These routes involve reactions of (1) a diisocyanate plus a disecondary diamine plus a polyether glycol, (2) a biscarbamyl chloride of a disecondary diamine plus a diprimary diamine or a diseconary diamine plus a polyether glycol or its bis(haloformate), and (3) phosgene plus a disecondary diamine plus a polyether glycol, as, for example, by simultaneously reacting phosgene, trans-2,5-dimethylpiperazine and poly(tetramethylene oxide) glycol.

Compositions which contain about 10% to about 40% by weight of the high melting segment or, conversely, about 60% to about 90% of the segment derived from the polyether glycol will be elastomers. The processes described herein can be used for making polymers outside this range but the filaments therefrom, although useful, are not preferred since they are not elastic. It has been found that the best elastomers are produced when the difunctional macro-molecule, i.e. the polyether glycol or its urethane-forming derivative, forms a segment which is substantially amorphous at room temperatures. Elastomers having polymer melt temperatures above 150° C. are preferred for filament formation.

The elastic compositions of this invention show high elastic recovery (above 90%), low stress decay (below 20%), and frequently have a higher modulus than rubber which is the nearest known equivalent in terms of elastic properties. Elastic recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

The high melting component is a urea, but as has been indicated previously, it is not esential that it be a homopolymer. Polymer compositions in which the high melting component contains a majority of urea segments which when prepared as separate polymers have polymer melt temperatures above 200° C. when the molecular weight is in the fiber-forming range are satisfactory. If the high melting component is a copolymer, it may be a copolyurea, or it may contain urethane, amide, or sulfonamide linkages. In many instances, the copolyureas are preferred. The melting point for the high melting segment is dependent upon the length of this segment and, to some extent, upon the molecular weight of the polyether that is to be used. As the high melting segment becomes shorter, it is preferred that it be a unit of a higher melting polymer. For those copolymers in which the urea segment is reduced to the minimum (i.e., the polyether segments are separated by only a single unit of the polyurea), it is preferred that this be a urea unit of a polymer which melts above 250° C.

The polyether glycol may be a homopolymer or a copolymer. The essential features are that they be difunctional and have a melting point below 50° C. The polyethers are primarily poly(alkylene oxide) glycols but some of the oxygens may be replaced with sulfur atoms and some of the alkylene groups may be replaced with arylene or cycloaliphatic radicals. Even where the linkages are the same, the compositions may be copolymers, such as a copolyether derived from more than one glycol. Copolymers are particularly useful when one of the macromolecular homopolymers melts too high to be useful in the process. Copolymer formation can then be used to reduce the melting point and also reduce or minimize undesirable crystallization in this segment of the final copolymer. These macrointermediates may have hydroxyl or chloroformate end groups, as long as they are capable of reacting with one of the monomeric constituents of the high melting component to form a urethane linkage. In any event, polymers prepared in accordance with this invention are similar to filament-forming and in elastic properties, while polymers prepared outside the melting point or molecular weight limitations of this invention will differ in such properties.

The scope of the invention is readily understood by referring to the following examples, which are given only for illustrative purposes and which should not be considered to represent the limits of the invention.

*Example I*

Three mols of poly(tetramethylene oxide) glycol having a molecular weight of approximately 1000 was reacted with two mols of 4-methyl-m-phenylene diisocyanate. A low molecular weight polymer having hydroxyl end groups and containing an average of three poly(tetramethylene oxide) groups per molecule was obtained. This product was then reacted with two mols of 4-methyl-m-phenylene diisocyanate per mol to provide isocyanate end groups.

This macromolecular diisocyanate (12.34 grams) was dissolved in 125 ml. of N,N-dimethylformamide along with 1.32 grams of 4-methyl-m-phenylene diisocyanate. To this was added with rapid stirring 1.24 grams of trans-2,5-dimethylpiperazine dissolved in 25 ml. of N,N-dimethylformamide. The polymer obtained after a few minutes reaction at room temperature had an inherent viscosity of 2.30 and a polymer melt temperature of 278° C. This copolyurea/urethane contained 15% by weight of an alternating copolyurea derived from the dimethylpiperazine and 4-methyl-m-phenylene diisocyanate and 85% by weight of urethane units derived from the reaction of 4-methyl-m-phenylene diisocyanate and poly(tetramethylene oxide) glycol. Films prepared from this polymer had a tenacity of 0.23 g.p.d., an elongation of 589%, an initial modulus of 0.09 g.p.d., a stress decay of 4.5, and a tensile recovery of 98%. A similar polymer is obtained by reacting 4-methyl-m-phenylenediamine with poly(tetramethylene oxide) bis-chloroformate and the biscarbamyl chloride of 2,5-dimethylpiperazine.

*Example II*

Poly(tetramthylene oxide) glycol (10 grams) of molecular weight of approximately 1000 was reacted with 3.5 grams of 4-methyl-m-phenylene diisocyanate. The macrodiisocyanate obtained was essentially a poly(tetramethylene oxide) end grouped by the diisocyanate. This macrodiisocyanate (13.5 grams) and 1.0 gram of 4-methyl-m-phenylene diisocyanate were dissolved in 100 ml. of N,N-dimethylformamide and placed in a blendor. To this was added rapidly with vigorous stirring 1.3 grams of trans-2,5-dimethylpiperazine dissolved in 25 ml. N,N-dimethylformamide. Reaction was continued with adequate stirring for 15 minutes at room temperature. A polymer with an inherent viscosity of 2.19 and a polymer melt temperature of 286° C. was obtained. This copolyurea urethane contained 15% by weight of copolyurea units derived from the reaction of dimethylpiperazine with 4-methyl-m-phenylene diisocyanate and 85% by weight of urethane units derived from the reaction of 4-methyl-m-phenylene diisocyanate and poly(tetramethylene oxide) glycol. The polymer was dissolved in a 60/40 mixture of trichloroethane/formic acid. Films cast from this solution had a tenacity of 0.58 g.p.d., an elongation of 640%, an initial modulus of 0.18 g.p.d., a stress decay of 8%, and a tensile recovery of 93%.

*Example III*

The macrodiisocyanate from the preceding example (13.5 grams) was dissolved in 125 ml. of N,N-dimethylformamide along with 5.45 grams of 4-methyl-m-phenylene diisocyanate. To this in a blendor was added rapidly with vigorous stirring 4.69 grams of trans-2,5-dimethylpiperazine dissolved in 25 ml. of N,N-dimethylformamide. After 15 minutes reaction at room temperature in the blendor a polymer with an inherent viscosity of 1.90 and a polymer melt temperature of 315° C. was obtained. This copolyurea urethane contained 40% by weight of copolyurea units derived by reacting the dimethylpiperazine with 4-methyl-m-phenylene diisocyanate and 60% by weight of urethane units derived from the reaction of 4-methyl-m-phenylene diisocyanate and poly(tetramethylene oxide) glycol. The polymer was dissolved in a 60/40 mixture of trichloroethane/formic acid and films cast from this solution. They had a tenacity of 0.34 g.p.d., an elongation of 293%, and an initial modulus of 0.2 g.p.d.

*Example IV*

The macrodiisocyanate of Example I (74 grams) was dissolved in 650 ml. of N,N-dimethylformamide along with 12.87 grams of 4-methyl-m-phenylene diisocyanate and placed in a blendor. To this was added with vigorous stirring 9.52 grams of trans-2,5-dimethylpiperazine dissolved in 100 ml. of the formamide. After several minutes reaction at room temperature, a polymer with an inherent viscosity of 3.5 and a polymer melt temperature of 290° C. was obtained. This copolyurea urethane contained 25% by weight of alternating polyurea units derived from the reaction of the dimethylpiperazine with 4-methyl-m-phenylene diisocyanate and 75% by weight of "trimer" urethane, that is, a macrodiisocyanate prepared under conditions such that the product had an average structure:

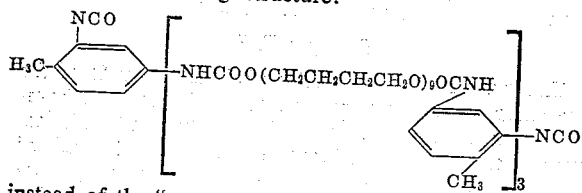

instead of the "monomer" of Example II with the structure:

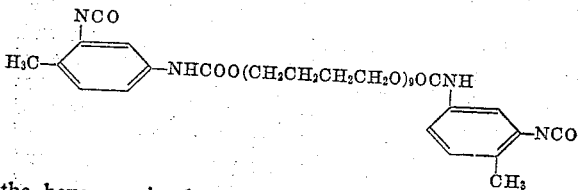

the hexagons in the formulas being benzene rings and the trimer urethane unit being derived from the reaction of 4-methyl-m-phenylene diisocyanate and poly(tetramethylene oxide) glycol. Filaments were produced by dry spinning the polymer dissolved in 60/40 trichloroethane/formic acid solution. The filaments had a fiber stick temperature of 185° C., a tenacity of 0.65 g.p.d., an elongation of 600%, an initial modulus of 0.15 g.p.d., a stress decay of 8%, and a tensile recovery of 96%.

*Example V*

The macrodiisocyanate of the preceding example (12.37 grams) was dissolved in 125 ml. of N,N-dimethylformamide along with 4.98 grams of 4-methyl-m-phenylene diisocyanate and the solution placed in a blendor. To this was added rapidly with vigorous stirring a solution of 3.62 grams of trans-2,5-dimethylpiperazine in 25 ml. of the formamide. After several minutes reaction at room temperature, a polymer with an inherent viscosity of 2.64 and a polymer melt temperature of 318° C. was obtained. This copolyurea urethane contained 40% by weight of alternating copolyurea units obtained from the reaction of the dimethylpiperazine with 4-methyl-m-phenylene diisocyanate and 60% by weight of "trimer" units. This polymer was dissolved in a 60/40 trichloroethane/formic acid mixture and films cast from this solution. They had a tenacity of 0.49 g.p.d., an elongation of 320%, and an initial modulus of 0.65 g.p.d.

*Example VI*

Poly(tetramethylene oxide) glycol (300 grams) with a molecular weight of 1000 was reacted with 35 grams of 4-methyl-m-phenylene diisocyanate. This macroglycol (22.3 grams) was reacted with 3.3 grams of p,p'-methylenediphenylisocyanate to produce the corresponding macrodiisocyanate. This compound (25.6 grams) was dissolved in 200 ml. of N,N-dimethylformamide along with 2.71 grams of p,p'-methylenediphenylisocyanate, and the solution placed in a blendor. To this was added rapidly with vigorous stirring 1.99 grams of trans-2,5-dimethylpiperazine dissolved in 50 ml. of N,N-dimethylformamide. After several minutes reaction at room temperature of polymer with an inherent viscosity of 2.92 and a polymer melt temperature above 300° C. was isolated. This copolyurea urethane contained 20% by weight of alternating copolyurea units derived from the reaction of the dimethylpiperazine with p,p'-methylenediphenylisocyanate and 80% by weight of alternating copolyurethane units derived from the step-wise reaction of 4-methyl-m-phenylene diisocyanate and p,p'-methylenediphenylisocyanate with poly(tetramethylene oxide) glycol. A 15% solution was prepared by dissolving this polymer in a 60/40 trichloroethane/formic acid mixture. This solution was dry spun to give as-spun filaments with a tenacity of 0.57 g.p.d., an elongation of 573%, an initial modulus of 0.09 g.p.d., a stress decay of 8%, a tensile recovery of 94%, and a fiber stick temperature of 220° C.

*Example VII*

The macroglycol (67 grams) from the preceding example was reacted with 9.44 grams of 4,4'-diphenylene diisocyanate to produce the corresponding macrodiisocyanate. This macrodiisocyanate (76.44 grams) was dissolved in 600 ml. of N,N-dimethylformamide along with 14.2 grams of 4,4'-diphenylene diisocyanate, and this solution was placed in a blendor. To this was added rapidly with vigorous stirring 9.12 grams of trans-2,5-dimethylpiperazine dissolved in 100 ml. of the formamide. After several minutes reaction at room temperature a polymer with an inherent viscosity of 3.5, which did not melt when heated to 300° C., was isolated. This copolyurea urethane contained 30% by weight of alternating copolyurea units derived from the reaction of the dimethylpiperazine with 4,4'-diphenylene diisocyanate and 70% by weight of alternating copolyurethane units derived from the step-wise reaction of 4-methyl-m-phenylene diisocyanate and 4,4'-diphenylene diisocyanate with poly(tetramethylene oxide) glycol. The polymer was dissolved in N,N-dimethylformamide to produce a 30% solution, which was dry spun to give as-spun filaments with a tenacity of 0.91 g.p.d., an initial modulus of 0.19

Example VIII

The macroglycol (22.3 grams) of the preceding example was reacted with 3.3 grams of p,p'-methylenediphenylisocyanate to give the corresponding macrodiisocyanate. This product (25.6 grams) was dissolved in 200 ml. of N,N-dimethylformamide along with 5.59 grams of p,p'-methylenediphenylisocyanate and the solution placed in a blendor. To this was added rapidly with vigorous stirring 3.31 grams of trans-2,5-dimethylpiperazine dissolved in 50 ml. of the formamide. After several minutes reaction at room temperature, a polymer with an inherent viscosity of 3.5, and a polymer melt temperature above 300° C. was obtained. This copolyurea urethane contained 30% by weight of alternating copolyurea units derived from the reaction of the dimethylpiperazine with p,p'-methylenediphenylisocyanate, and 70% by weight of the alternating copolyurethane units of Example VI. The polymer was dissolved in N,N-dimethylformamide to give a 30% solution, which was dry spun to produce as-spun filaments with a tenacity of 0.94 g.p.d., an elongation of 510%, an initial modulus of 0.25 g.p.d., a stress decay of 9%, and a tensile recovery of 94%. A similar polymer is obtained by reacting p,p'-diaminodiphenylmethane with poly(tetramethylene oxide) bischloroformate and the biscarbamyl chloride of 2,5-dimethylpiperazine.

Example IX

The macroglycol (67 grams) from the preceding example was reacted with 9.44 grams of 4,4'-diphenylene diisocyanate to give the corresponding macrodiisocyanate. This product (76.44 grams) was dissolved in 600 ml. of N,N-dimethylformamide along with 9.44 grams of 4,4'-diphenylene diisocyanate and the solution was placed in a blendor. To this was added rapidly with vigorous stirring, 6.84 grams of trans-2,5-dimethylpiperazine dissolved in 100 ml. of the formamide. After several minutes reaction at room temperature a polymer with an inherent viscosity of 2.8 was obtained which did not melt when heated up to 300° C. This copolyurea urethane contained 20% by weight of alternating copolyurea units derived from the reaction of dimethylpiperazine with 4,4'-diphenylene diisocyanate and 80% by weight of the alternating copolyurethane units of the preceding example. The polymer was dissolved in N,N-dimethylformamide to give a 30% solution, which was dry spun to produce as-spun filaments with a tenacity of 0.90 g.p.d., an elongation of 530%, an initial modulus of 0.12 g.p.d., a stress decay of 10%, a tensile recovery of 88%, and a fiber stick temperature of 220° C.

Example X 4-methyl-m-phenylene diisocyanate (1.50 grams) was dissolved in approximately 10 ml. of benzene containing about 0.06 gram of triethylamine. This solution was added to 20.2 grams of a benzene solution containing 5.80 grams of poly(tetramethylene oxide) glycol with a molecular weight of 3265. The reaction mixture was diluted to 40 ml. with benzene and the reaction continued for about 1.5 hours at 50° C. to provide the derivative of the glycol with diisocyanate ends.

Benzene (10 ml.) was added with vigorous stirring to a solution prepared by dissolving 0.1 gram of sodium "Lorol" sulfate PT, 0.21 grams of trans-2,5-dimethylpiperazine, and a few drops of 0.1 N sodium hydroxide in 20 ml. of water. "Ortholeum 162" (0.02 gram) was added to a 10 ml. aliquot of the macrodiisocyanate solution prepared above and this added rapidly with vigorous stirring to the aqueous solution. Polymer was collected after stirring had been continued for approximately 20 minutes at room temperature. This polymer contained 25% by weight of alternating polyurea units derived from the reaction of the dimethylpiperazine and 4-methyl-m-phenylene diisocyanate and 75% by weight of urethane units derived from the reaction of the macroglycol with the diisocyanate.

Example XI

The process of the preceding example was repeated except that 0.20 gram of piperazine were substituted for the dimethylpiperazine. In this case, it was necessary to add a small quantity of 0.1 N sodium hydroxide to the reaction mixture to bring the pH to 7. Approximately 40 minutes stirring was required to obtain a satisfactory coagulated polymer.

Example XII

The macroglycol (30 grams) from the preceding example was reacted with 3.50 grams of 4-methyl-m-phenylene diisocyanate to produce a "trimer" with hydroxyl ends. This was reacted with 5.0 grams of p,p'-methylenediphenylisocyanate to give the corresponding "trimer" with isocyanate ends. This product was dissolved in 100 ml. of N,N-dimethylformamide along with 3.75 grams of p,p'-methylenediphenylisocyanate. To this was added rapidly with vigorous stirring a solution of 2.47 grams of p,p'-diaminodiphenylmethane and 1.71 grams of trans-2,5-dimethylpiperazine in 42 ml. of N,N-dimethylformamide. After 15 minutes reaction at room temperature, a polymer was obtained which had an inherent viscosity in hexamethylphosphoramide of 0.85 and which did not melt when heated up to 300° C. This polymer contained 20% by weight of alternating polyurea units, one segment of which was derived from the reaction of p,p'-diaminodiphenylmethane with p,p'-methylenediphenylisocyanate and the other segment was derived from a reaction of the dimethylpiperazine with this diisocyanate.

Example XIII

A "trimer" was prepared from the poly(tetramethylene oxide) glycol and 4-methyl-m-phenylene diisocyante as described in the preceding example. This "trimer" was reacted with 3.0 grams of 4-methyl-m-phenylene diisocyanate. This product was dissolved in 100 ml. of N,N-dimethylformamide along with 5.25 grams of 4-methyl-m-phenylene diisocyanate. To this solution was added rapidly with vigorous stirring 3.36 grams of piperazine dissolved in 100 ml. of the formamide. After 15 minutes reaction at room temperature a polymer with an inherent viscosity in hexamethylphosphoramide of 1.02 and a polymer melt temperature of approximately 290° C. was obtained. This copolyurea urethane contained 25% by weight of alternating polyurea units derived from the reaction of piperazine with 4-methyl-m-phenylene diisocyanate and 75% by weight of "trimer" units.

Example XIV

The "trimer" (32.0 grams) with hydroxyl ends of the preceding example was reacted with 2.60 grams of hexamethylene diisocyanate to produce a "trimer" with isocyanate ends. This product was dissolved in 100 ml. of N,N-dimethylformamide along with 4.20 grams of hexamethylene diisocyanate. To this solution was added rapidly with vigorous stirring a solution of 4.64 grams of trans-2,5-dimethylpiperazine in 100 ml. of N,N-dimethylformamide. After 15 minutes reaction, a polymer with an inherent viscosity in hexamethylphosphoramide of 0.85 and a polymer melt temperature of 220° C. was obtained. This polymer contained 25% by weight of alternating polyurea units derived from the reaction of dimethylpiperazine with hexamethylene diisocyanate and 75% by weight of alternating polyurethane units derived from the step-wise reaction of poly(tetramethylene oxide) glycol with 4-methyl-m-phenylene diisocyanate and hexamethylene diisocyanate.

Example XV

A macroglycol with a molecular weight of 2385 was prepared by the self-condensation of monothioglycol.

This macroglycol (71.55 grams) was reacted with 10.50 grams of 4-methyl-m-phenylene diisocyanate to produce a corresponding macrointermediate with isocyanate ends. This product was dissolved in 500 ml. of dimethylformamide along with 7.86 grams of 4-methyl-m-phenylene diisocyanate. To this solution was added rapidly with vigorous stirring a solution of 8.55 grams of trans-2,5-dimethylpiperazine in 100 ml. of N,N-dimethylformamide. After 15 minutes reaction at room temperature a polymer with an inherent viscosity in m-cresol of 1.03 and a polymer melt temperature of 290° C. was obtained. This copolyurea urethane contained 20% by weight of alternating polyurea units derived from the reaction of 4-methyl-m-phenylene diisocyanate with dimethylpiperazine and 80% by weight of urethane units derived from the reaction of the macroglycol with the diisocyanate. This polymer was dry spun from a 60/40 trichloroethane/formic acid solution to produce as-spun filaments with the following properties: tenacity=0.17 g.p.d., elongation=700%, initial modulus=0.09 g.p.d., and stress decay=18%.

The expression "polymer melt temperature," as used here, is the minimum temperature at which a sample of the polymer leaves a wet, molten trail as it is stroked with moderate pressure across a smooth surface of a heated brass block. "Polymer melt temperature" has sometimes in the past been referred to as "polymer stick temperature." "Fiber stick temperature" is the temperature at which the fiber will just stick to a heated brass block when held against the surface of the block for five seconds with a 200 gram weight. "Initial modulus" is determined by measuring the initial slope of the stress strain curve.

The diamines used to prepare these polymers may be any primary or secondary aliphatic, alicyclic, heterocyclic, or aromatic diamine. It has been pointed out earlier that at least 50 mol percent of the diamines should be secondary diamines. The use of secondary diamines reduces the number of urea hydrogens, that is, the hydrogen atoms in the group —NHCONH—. This reduces the possibility of cross-linking with diisocyanates, since isocyanates react much more rapidly with urea hydrogens than with urethane or amide hydrogens. It also tends to lower interchain forces as a result of the decrease in hydrogen bonding. These differences make themselves evident in the form of an increase in solubility over the customary urea polymers. Thus, these polymers are particularly adapted to the preparation of filaments. Accordingly, the ureas prepared from compositions in which all of the diamines are disecondary diamines are preferred. This invention provides high melting, soluble urea polymers from which solutions in common solvents sufficiently concentrated for spinning filaments can readily be prepared.

Representative examples of suitable secondary diamines are N,N'-dimethyltetramethylene diamine, N,N'-dimethylphenylene diamine, N,N'-dimethyl-p-xylylene diamine, N,N'-dimethyl-1,4-diaminocyclohexane, piperazine, and trans-2,5-dimethylpiperazine. These latter two diamines are preferred because high melting polymers with unusually high solubility can be prepared from them. Mixtures of these secondary diamines, as well as mixtures of secondary diamines with primary diamines, such as ethylene diamine, tetramethylene diamine, pentamethylene diamine, hexamethylene diamine, heptamethylene diamine, octamethylene diamine, p-xylylene diamine, 1,4-diaminocyclohexane, p-phenylene diamine, 1-methyl-2,4-diaminobenzene, bis(p-aminocyclohexyl) methane, and many others may be used. Derivatives of these diamines may also be used as long as the substituents do not interfere with the polymerization. For example, they may have hydrocarbon side chains or be substituted with halogens or nitro groups which are inert under the conditions used therein.

The secondary diamines may be used in the form of their bis(carbamyl halide) derivatives to prepare the ureas. These may be reacted with disecondary diamines to produce ureas with no urea hydrogen, or they may be reacted with diprimary diamines to produce monosubstituted ureas. Ureas of the latter type may also be prepared by reacting a disecondary diamine with a diisocyanate. Hydrogen-free ureas may also be obtained by reacting a disecondary diamine with phosgene.

Aliphatic diisocyanates, such as, hexamethylene diisocyanate, may be used but the aromatics are preferred. Of these the symmetrical, such as p,p'-methylene diphenylisocyanate, are preferred, because the polymers therefrom are more soluble and the fibers therefrom have higher fiber stick temperatures.

Representative polyether glycols which may be used include the polyoxathiaalkylene glycols, such as poly(1-oxa-4-thiahexane), poly(1,4-dioxa-7-thianonane), and poly(1,6-dioxa-9-thiahendecane); the poly(alkylene oxide) glycols, such as poly(ethylene oxide) glycol, poly(propylene oxide) glycol, poly(tetramethylene oxide) glycol, and poly(decamethylene oxide) glycol; polydioxolane, and polyformals prepared by reacting formaldehyde with other glycols or mixtures of glycols, such as tetramethylene glycol and pentamethylene glycol. Some of the alkylenes in these polyethers may be replaced with arylenes or cycloaliphatic radicals.

The preferred difunctional polyethers are poly(alkylene oxide) glycols, which may be represented by the formula

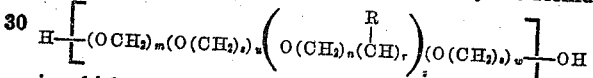

in which $m$ and $r$ are 0 or 1; $n$ is 2–10 when $r$ is 0 and 1–9 when $r$ is 1; $s$ is 0–10, $u$ and $w$ are 1–50; $v$ is 4–125; R is H or a low molecular weight alkyl group such as methyl. These polyethers may be used as the glycols, as shown, or they may be converted to bis(haloformates), such as the bis(chloroformates), for example, by reacting with phosgene prior to use or preparing these polymers. The halogen in the bis(haloformates) or in the bis-(carbamyl halides) may be chlorine, bromine, iodine or fluorine. Generally, this will be chlorine.

The preferred macrointermediate of this type is poly(tetramethylene oxide) glycol and/or its derivatives. Particularly useful are copolymers formed when this is combined with dimethylpiperazine, and one or more of the following diisocyanates: 4-methyl-m-phenylene diisocyanate, p,p'-methylene diphenylisocyanate, and/or 4,4'-diphenylene diisocyanate. "Trimers" containing three glycol units and having isocyanate ends and the corresponding "dimers" have been found useful in preparing polymers by solution or interfacial polymerization methods. Of particular interest are the elastic compositions prepared by proper combination of any of these ingredients.

Three methods are used for preparing polymers of this type. They are: (1) melt polymerization, (2) interfacial polymerization, and (3) solution polymerization. Melt polymerization has generally not been found as satisfactory for preparing the linear fiber-forming copolymers of this invention when isocyanates are used and there are urea hydrogens present, since it is difficult to avoid gel formation and cross-linking. Very little gel formation or cross-linking can be tolerated in polymers which are to be used for filament formation.

Interfacial polymerization has rapidly been attaining increased importance in the polymer field. It is a rapid moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. For preparing the polymers of this invention the reactants in one liquid phase may be one or more of the diamines and the reactants in the other liquid phase may be one or more of the diisocyanates.

Other combinations are possible, as has been indicated earlier. The two liquid phases are mixed to form a two-phase system in which the diamine and the diisocyanate are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it, at least partially. The phases are mixed until the desired condensation polymerization has taken place and then, if desired, the polymers obtained are isolated.

Low molecular weight polymers have been prepared for some time by forming a homogeneous solution of reactants and allowing the reaction to continue at moderate temperatures or heating to produce the polymers. However, only recently have high molecular weight polymers been prepared successfully by this method. The solution polymerization method used here for preparing polyureas involves, for example, dissolving diamines and diisocyanates in separate portions of the same solvent, and then mixing to form high molecular weight polymers. The molecular weight of the polymers is controlled by the choice of the solvent medium or by the use of mixtures of appropriate solvents. The solvent is one which is inert to the reactants and is usually selected to produce a high molecular weight polymer.

For optimum results, the copolyureas of this invention should have an inherent viscosity of the order of 1.0–4.0 or above, although copolymers having inherent viscosities as low as 0.5 are useful. Polymers in the lower molecular weight range are useful in certain applications, such as in preparation of coatings and molded objects. However, the ones of particular interest are those with molecular weights in the fiber-forming range, i.e., above about 5,000. Inherent viscosity is defined as $$\ln \frac{\eta_r}{C}$$

in which $\eta_r$ is the viscosity of a dilute solution of the polymer divided by the viscosity of the solvent in the same units and at the same temperature, and C is the concentration in grams of the polymer per 100 ml. of solution. The inherent viscosities recorded here were measured in m-cresol/formic acid mixtures. In most cases, a concentration of 0.5 gram per 100 ml. of solution was used.

When polymers are prepared by the interfacial or solution methods, the polymers frequently separate as soon as they have reached an adequate molecular weight value. If this does not happen, the polymer can be separated by the addition of a precipitating and/or coagulating agent. However, it is possible to prepare concentrated solutions of many of these polymers by the use of these techniques, and such solutions can be used directly in the preparation of filaments, bristles, films, and similar articles.

This invention represents an important development in that it demonstrates for the first time a method for preparing polyether/urethane/urea polymers which have both a high polymer melt temperature and a low glass or second order transition temperature. A number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of the cross-linked products makes subsequent shaping difficult. Polymers with high polymer melt temperatures also have had, in the past, high second order transition temperatures; this means that they tend to be non-elastic at room temperatures. The transition temperature can be lowered and the room temperature elasticity correspondingly increased through copolymer formation. However, this has invariably led to a large drop in the polymer melt temperature.

The elastic polymers of this invention are unique in that they are linear polymers with properties equivalent to those of the cured cross-linked elastic products now available. This has been accomplished by substituting crystalline regions of the high melting components to replace the chemical cross-links of cured elastomers, such as rubber. The absence of chemical cross-links results in improved solubility. The practical end result is that these polymers can be dissolved in fairly common solvents which can be used to prepare solutions that can be readily adapted to the preparation of films and filaments and similar articles in conventional equipment.

The copolyureas of this invention have properties which make them useful in many applications. Thus, they can be molded to form a variety of shaped objects, extruded to form rods, bars, tubes, films, filaments, fibers, and the like. In film form they are useful as shoe-upper leather replacements or for use in shoe soles and heels, or as safety glass interlayers. The filaments are useful in such applications as fabrics, fishing lines, rope, papers, felts, among others. The elastic polymers of this invention are useful as binders in papers and laminates.

The elastic copolyureas are a particularly desirable feature of this invention. The best compositions of this invention exhibit stress decay properties equivalent to those of rubber. The higher tenacities, high initial modulus, superior abrasion resistance and more easily controlled elongation of these polymers fit them for many applications, particularly in filament form, for which rubber is undesirable. Most of these copolymers possess the additional advantage that they are easily fabricated. A large percentage of the rubber threads used are prepared by slitting rubber sheets. This produces relatively large denier filaments, which cannot be converted readily to multifilaments and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber filaments have poor abrasion resistance.

Some of these copolyureas also possess the desirable characteristics of being hydrophylic. The ability to absorb moisture is desirable for a textile fiber because of the fact that the fabrics made from them are more comfortable to wear. The low moisture absorption of many of the hydrophobic fibers now available is undesirable in many applications. A polymer with high water absorption characteristics also has interesting applications in film form, particularly as a replacement for leather in shoe uppers.

The copolyureas of this invention are more resistant to attack by oxygen than any other class of elastomer known. However, it is sometimes necessary to stabilize certain of the compositions to heat or radiation by ultraviolet light. Fortunately this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state. An extensive list of suitable stabilizers is given in copending application, Shivers, Serial No. 329,114; filed December 31, 1952, now abandoned.

Films and filaments can be prepared by melt, dry or wet spinning procedures. In melt spinning, care should be taken to avoid thermal degradation. In shaping filaments using solutions, solvents which have been found satisfactory for preparing solutions of suitable concentration are N,N-dimethylformamide, N,N-dimethylacetamide, tetramethylene cyclic sulfone, formic acid, and 60/40 trichloroethane/formic acid mixtures.

Conventional conditions are used for dry spinning, except that the elastic filaments usually have to be talced or lubricated, usually with water, because they tend to be somewhat tacky immediately after extrusion. Spinning speeds are usually somewhat lower than those used in some commercial processes for textile filaments, but speeds in excess of 300 yards per minute have been attained with the elastic filaments of this invention. This is considered excellent for filaments of this type.

When wet spinning, the spinning speeds are usually lower, but this procedure has a definite advantage when larger denier filaments are being prepared. A preferred solvent for wet spinning is N,N-dimethylformamide. The polymer solutions in this solvent are generally extruded into a hot water bath.

It is possible to prepare stable dispersions of certain polymers of this invention, including the elastomeric ones, and shaped articles can be prepared by extruding, coagulating and coalescing the polymer particles. In some instances heat coalescence will be satisfactory but for others a solvent will have to be used to promote coalescence. Shaping and polymerization can also be combined into a single step.

A drawing operation is usually not necessary to develop desirable properties, particularly satisfactory elastic properties, in these filaments. However, the overall properties of the films and filaments prepared from many of these copolyureas are frequently improved by a cold drawing operation, which results in increased orientation and crystallinity in the final structure. Therefore, prior to final packaging, the yarns can be drawn at a suitable draw ratio, for example, 2 to 10X, for the particular copolymer, and relaxed, to give a product with a desired combination of tenacity, initial modulus, yarn elongation, elasticity, etc.

The elastic polymer yarns of this invention are characterized by higher strength and streach modulus and substantially better abrasion resistance than any rubber threads known. Stretch modulus measures the force required to elongate the yarn a given percentage. A garment made of yarns having high tenacity and high stretch modulus will not only be durable but will also exert substantial pressure on the body of the wearer after the garment is stretched into position as desired, for example, in surgical stockings. Yarns of this invention have many advantages over rubber threads. For example, they may be spun readily into multifilament yarns and into low denier filaments. They have superior abrasion resistance, a very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

The elastic properties attained by this invention result in part from the novel combination of a segment of a "hard" or high melting polymer with a "soft" or low melting of polymeric segment. The polymers from which the former segments are derived all melt above 200° C., some melting points being exemplified as follows: copolyurea from dimethylpiperazine and 4-methyl-m-phenylenediisocyanate decomposes at 400° C., and copolyurea from dimethylpiperazine and p,p'-methylenediphenylisocyanate, 307° C. The melting points of the polyether glycols are below about 50° C., as, for example, poly tetramethylene oxide) glycol having an average molecular weight of 1000, about 20° C.; poly(tetramethylene oxide) glycol having a molecular weight of 1500, about 30° C.; and poly(tetramethylene oxide) glycol of 3000 molecular weight, about 40° C. The melting points of the polyether glycols are generally not sharp and may vary for a given molecular weight. Thus, some samples of the higher molecular weight polyether glycols may have apparent melting points as high as 55° C. The "hard" segments may be combined with the low melting segments to produce a large number of the elastomers of this invention.

As many widely different embodiments of this invention may be made without departing from the spirit and scope thereof, it is to be understood that this invention is not to be limited to the specific embodiments thereof except as defined in the appended claims.

We claim:

1. A filament-forming linear segmented polymer consisting essentially of a multiplicity of urea segments containing at least one repeating unit of a fiber-forming polyurea, said repeating unit being of the formula

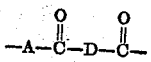

wherein —A— and —D— are bivalent organic radicals containing terminal nitrogen atoms, to each of which nitrogen atoms is attached one of the indicated free valences of the said radicals —A— and —D—, with the proviso that not more than 50% of said nitrogen atoms bear hydrogen, the said polyurea having a melting point of at least 200° C. in the fiber-forming molecular weight range, at least some of said urea segments being connected by urethane linkages of the formula

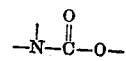

wherein

is one of the terminal nitrogen atoms of the aforementioned radical —A—, to polyether residues which are the radicals remaining after removal of the terminal hydroxyl groups of a polyether glycol consisting essentially of divalent hydrocarbon groups joined by intralinear ether oxygen atoms, said polyether glycol having a melting point below about 50° C. and a molecular weight above about 600, said urea segments constituting from about 10% to about 40% by weight of the said polymer.

2. A filament-forming linear segmented polymer consisting of urea segments chemically connected through urethane linkages to polyether segments, said urea segments containing at least one repeating unit of a urea polymer prepared from a disecondary organic diamine and a complementary monomer capable of forming with said diamine a linear urea polymer having a melting point above 200° C. in the molecular weight range above 5000, said complementary monomer being selected from the group consisting of an organic diisocyanate, a biscarbamyl halide of an organic diamine, and phosgene, said polyether segments being the residues remaining after removal of the terminal hydroxyl groups of a difunctional hydroxyl-terminated polyether having a melting point below about 50° C. and a molecular weight above about 600, said difunctional hydroxyl-terminated polyether being selected from the group consisting of poly(alkylene oxide) glycols, poly(alkylene arylene oxide) glycols, poly (alkylene cycloalkylene oxide) glycols, poly(oxathiaalkylene) glycols, polydioxolane and said glycols which contain a minor proportion of urethane linkages, said urea segments being present in an amount from about 10% to about 40% by weight of said segmented polymer.

3. The process of preparing linear fiber-forming segmented polymers consisting of urea segments chemically connected through urethane linkages to polyether segments which consists of reacting a mixture of a bishaloformate of a polyether glycol having a molecular weight above about 600 and a melting point below about 50° C. and a bicarbamyl halide of a disecondary organic diamine with an essentially stoichiometric amount of an organic diamine, said biscarbamyl halide and said organic diamine being capable of forming a linear crystalline urea polymer having a melting point above about 200° C. in the molecular weight range above 5000, said bishalocarbamyl halide being present in a ratio with said bishaloformate of said polyether glycol such that from about 10% to about 40% of said urea segments are present in said segmented polymer.

4. The process of claim 3 wherein said organic diamine a disecondary diamine.

5. The linear segmental polymer of claim 1 in the form of a filament.

6. A filament in accordance with claim 5 having an elastic recovery above 90% and a stress decay below 20%.

7. A linear segmented polymer in accordance with claim 3 with a polymer melt temperature above 150° C.

8. The polymer of claim 1 in which said polyether glycol is a poly(tetramethylene oxide) glycol.

9. The linear segmented polymer of claim 1 in the form of a film.

10. A process in accordance with claim 3 wherein said polyether glycol has a molecular weight between about 800 and about 5000.

11. A process in accordance with claim 3 wherein the said fiber-forming segmented polymers have an inherent viscosity between about 0.5 and about 4.

12. A process in accordance with claim 11 wherein said viscosity is between 1 and 4.

13. A process in accordance with claim 3 wherein said polyether glycol is a poly(alkylene oxide) glycol.

14. A process in accordance with claim 13 wherein said poly(alkylene oxide) glycol is poly(tetramethylene oxide) glycol.

15. A process in accordance with claim 3 wherein said disecondary organic diamine is a heterocyclic diamine.

16. A process in accordance with claim 15 wherein said diamine is a piperazine.

References Cited in the file of this patent

UNITED STATES PATENTS

| | | |
|---|---|---|
| 2,692,874 | Langerak | Oct. 26, 1954 |

FOREIGN PATENTS

| | | |
|---|---|---|
| 18,733 | South Africa | Feb. 1, 1954 |
| 876,906 | France | Aug. 24, 1942 |
| 519,014 | Belgium | Oct. 5, 1953 |
| 1,074,451 | France | Mar. 31, 1954 |

UNITED STATES PATENT OFFICE

CERTIFICATE OF CORRECTION

Patent No. 2,929,803

March 22, 1960

August Henry Frazer et al.

It is hereby certified that error appears in the printed specification of the above numbered patent requiring correction and that the said Letters Patent should read as corrected below.

Column 3, line 23, after "(1)" insert -- a --; column 4, line 22, for "similar to" read -- similar in --; column 8, line 37, for "gxlycol" read -- glycol --; column 10, line 38, for "use or" read -- use in --; column 13, line 39, for "streach" read -- stretch --; line 61, after "melting" strike out "of"; column 15, line 8, after "diamine" insert -- is --; line 16, for the claim reference numeral "3" read -- 1 --.

Signed and sealed this 30th day of August 1960.

(SEAL)
Attest:

ERNEST W. SWIDER
Attesting Officer

ROBERT C. WATSON
Commissioner of Patents